United States Patent [19]

Sorensen

[11] 4,231,608
[45] Nov. 4, 1980

[54] SUNROOF STRUCTURE

[75] Inventor: Norman L. Sorensen, Detroit, Mich.

[73] Assignee: Wisco Corporation, Ferndale, Mich.

[21] Appl. No.: 820,105

[22] Filed: Jul. 29, 1977

[51] Int. Cl.² .............................................. B60J 7/18
[52] U.S. Cl. ..................................... 296/216; 49/400; 49/485
[58] Field of Search ...................... 296/137 R, 137 B; 52/658, 659; 49/400, 485, 489, 497

[56] References Cited

U.S. PATENT DOCUMENTS

| | | | |
|---|---|---|---|
| 2,556,062 | 6/1951 | Buehrig | 296/137 B |
| 2,952,053 | 9/1960 | Frehse | 49/497 X |
| 3,857,199 | 12/1974 | Frach et al. | 49/485 X |
| 3,883,993 | 5/1975 | Pullan | 49/485 X |
| 3,913,971 | 10/1975 | Green | 296/137 B |
| 3,974,753 | 8/1976 | Blomgren | 296/137 B X |
| 4,005,901 | 2/1977 | Lutke et al. | 296/137 B |
| 4,036,522 | 7/1977 | DeRees et al. | 296/154 |
| 4,067,605 | 1/1978 | Green et al. | 296/137 B |
| 4,126,352 | 11/1978 | Vogel | 296/137 B |
| 4,133,576 | 1/1979 | Chrysler | 296/137 B |

Primary Examiner—John J. Love
Assistant Examiner—Norman L. Stack, Jr.
Attorney, Agent, or Firm—Basile, Weintraub & Hanlon

[57] ABSTRACT

A frame extending around an opening in a vehicle roof has a resilient molding adapted to support the perimeter of a curved glass panel to close off the opening. A pair of bayonets projecting in spaced relation to the underside of the forward edge of the panel mates with a recessed member carried by the frame when the panel is inclined with respect to the roof to act as a pivotable hinge allowing motion of the panel between a closed position and that inclined position. A two-part fastener for the rear edge of the panel includes a handle pivotally connected to the underside of the panel and a tongue pivotally connected to the handle and adapted to be retained in a lock member carried by the frame. The handle acts as an over-center linkage to bend the panel against its curvature, forcing its perimeter into engagement with the frame. The lock member includes a recessed portion which is provided with a rib to prevent the inadvertent opening of the lock member when the handle is in a closed position. The handle may be extended to an opened, detented position to maintain the panel with its rear edge tilted upwardly away from the opening. The handle has a detent release mechanism which automatically releases the detent when the handle is moved from its opened position.

1 Claim, 8 Drawing Figures

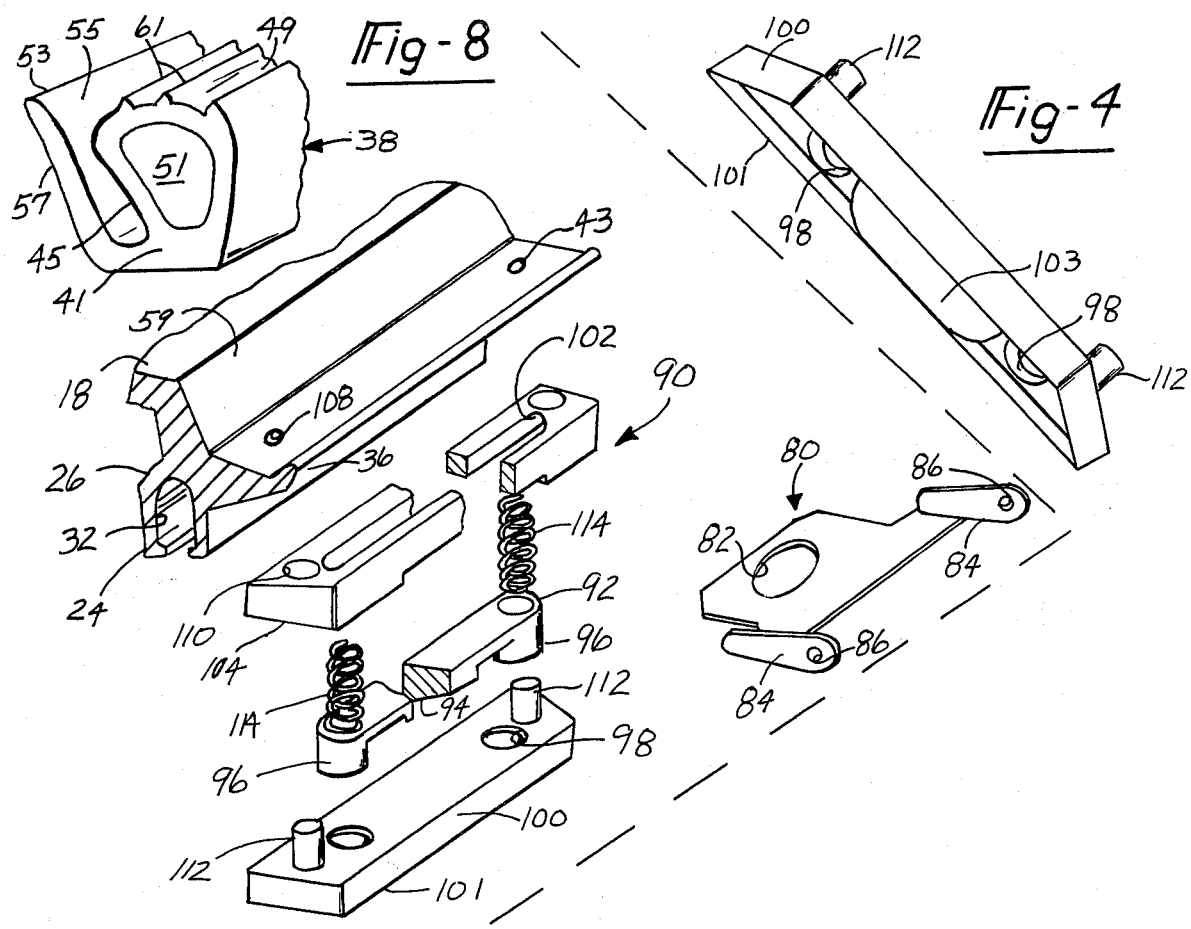

SUNROOF STRUCTURE

BACKGROUND OF THE INVENTION

I. Field of the Invention

This invention relates to a removable sunroof panel for a vehicle roof and, more particularly, to an improvement in the fastener arrangement for supporting the panel in one of a plurality of operative relationships with respect to the roof.

II. Cross Reference to Related Applications

This application relates to improvements in the sunroof arrangement disclosed in pending application Ser. No. 583,260 filed June 3, 1975, entitled "Detachable Sun Roof Panel for Automobiles."

III. Prior Art

The above-referenced application discloses an opening in a vehicle roof adapted to receive a removable, transparent sunroof panel. The panel is retained in the framed opening by a pair of bayonets which project from the underside of the panel on the forward edge and cooperate with the adjacent panel edge to engage the frame element. A two-part fastener for the rear edge of the panel includes a handle pivotally connected to the underside of the panel and a tongue pivotally connected to the handle and adapted to be retained in a lock member in the frame. The handle acts as an over-center linkage to bend the panel against its curvature, forcing its perimeter into engagement with the frame, or may be extended to maintain the panel with its rear edge tilted away from the opening.

Other sunroof structures, such as disclosed in U.S. Pat. No. 2,215,022, employ panels supported for a sliding motion between a closed position, covering an opening in the vehicle roof, and an open position in which they are supported in a compartment affixed to the underside of the vehicle roof, behind the opening.

Other examples of sunroof structures are disclosed in U.S. Pat. Nos. 3,913,971; 3,955,848; and 3,537,212; and West German Patentenmeldung-V7038V/68b. These patents are relevant in that they were cited in the aforementioned patent application.

IV. Prior Art Statement

The prior art listed hereinbefore includes, in the opinion of the applicant, the closest art of which applicant is aware.

SUMMARY OF THE INVENTION

The present invention is broadly directed toward an improvement in an apparatus for retaining a removable panel within a sunroof opening which allows the panel to either close off the opening or to be supported with its rear edge tilted upwardly, away from the rear edge of the opening, so that the panel is inclined with respect to the plane of the roof.

As will be described hereinafter in greater detail in the following description of a preferred embodiment of the invention, the apparatus includes a frame extending around the perimeter of the opening. The frame has a novel, resilient molding which functions as a supporting surface, substantially in the plane of the roof, for retaining the edge of the panel. The unique shape of the molding prevents it premature separation from the frame. A pair of recessed members are carried by the frame, below the supporting surface, at spaced points along the forward end of the opening, and are adapted to receive a pair of mating bayonets affixed to the underside of the forward edge of the panel.

A two-part fastener, which separably joins the rear end of the panel to the rear end of the frame, includes a push-button release lock member affixed to the underside of the frame. The latch handle for the fastener is pivotally connected to a hinge which is, in turn, pivotally supported on the underside of the rear end of the panel. A tongue adapted to be retained in the lock member and released by the push button is also pivotally attached to the handle. The handle, the hinge, and the tongue form a two-element linkage which may be disposed in either a closed position, wherein the handle lies adjacent the underside of the frame and pulls the panel down against the frame, or in an extended position, wherein the handle projects upwardly from the frame and supports the rear end of the panel above the frame so that the panel is inclined with respect to the frame in a ventilating position. A detent mechanism carried by the handle maintains the handle in the opened position. To remove the panel, the push button is depressed, releasing the tongue from the lock member, and the panel is pivoted about the forward end to a position wherein the bayonets may be removed from the forward frame opening. The lock member includes a recessed portion which is provided with a rib arrangement that prevents the inadvertent opening of the lock member when the handle is first snapped into the closed position. The handle has a detent release mechanism which automatically releases the detent when the handle is moved to a closed position.

It is therefore an object of the present invention to provide a new and improved sunroof structure which is relatively simple in construction, yet one which is of low cost and is reliable in operation.

Other objectives, advantages and applications of the present invention will become apparent by those skilled in the art of sunroof structures when the accompanying description of one example of the best mode for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 4 is a perspective view of the lower portion of the lock member carried by the frame;

FIG. 5 is a partially sectional view through the left end of the lock member illustrated in FIG. 2;

FIG. 6 is a detailed, sectional view through the side of the latch handle illustrating the detent release mechanism;

FIG. 7 is a detailed, sectional view through the latch handle, taken along Line 7—7 of FIG. 6; and FIG. 8 is an exploded, perspective view of the roof latch and the components of the locking mechanism carried by the frame.

DESCRIPTION OF THE PREFERRED EMBODIMENT

Figure 1:
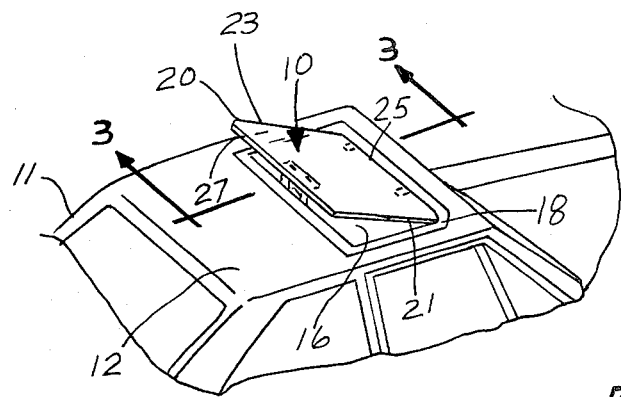
FIG. 1 is a fragmentary, perspective view of an automobile incorporating a sunroof formed in accordance with the principles of the present invention, with the panel shown in a tilted ventilating position.

Referring now to the drawings and, in particular, to FIG. 1 for one example of the present invention in the form of a sunroof 10 carried by an automobile 11, although it is equally applicable to trucks, vans, recreational vehicles, and the like.

The roof of the automobile is typically formed from an outer sheet metal skin 12 and a fabric headliner 14 (FIGS. 2 and 3), disposed under the roof sheet 12 and spaced therefrom. In accordance with the present invention, a sunroof opening 16 is formed in the roof, usually over the front seat of the vehicle, and the perimeter of this opening is finished with a frame member 18. The frame 18 is adapted to removably secure a panel 20, preferably formed of a sheet of shatterproof, tempered, tinted glass and having dimensions complementary to the opening 16.

The panel 20 is formed with a gradual curvature across its width so that its concave side faces the frame. Accordingly, the two side edges 21 and 23 are straight, and the forward edge 25 and rear edge 27 are bowed away from the frame 18. The frame 18 may be level across its width or may have a slight crown, but its curvature should be less than that of the panel 20 so that when the forward edge 25 of the panel 20 is first lowered into position against the frame 18, the panel's two side edges 21 and 23 abut the side edges of the frame 18 and the center of the rear edge 27 is slightly raised with respect to the frame 18. In the preferred embodiment of the invention the curvatures of the panel 20 and the frame 18 are such that the center of the rear edge 27 of the panel 20 is separated from the frame 18 by about ⅜ of an inch in this position.

The frame 18 may be formed of extruded aluminum, bent into a closed section, adapted to fit the roof opening 16, and having its ends joined by an appropriate fastening method, such as rivets or welding. The frame 18 includes an extending section 22 which overlies the top of the roof 12 at the aperture. A downwardly extending section 24 of the molding has a surface 26 inclined inwardly under the extending section 22 to form a pair of opposed, tapered surfaces adapted to receive tapered wedges 28 which abut the underside of the perimeter of the roof 12 to lock the frame to the roof. The wedges 28 extend along substantial portions of the interface between the frame 18 and the roof 12. The wedges 28 are fixed to the frame 18 by threaded fasteners 30. The downwardly extending section 24 of the frame contains a downwardly opening groove 32 adapted to receive a plastic molding 34 which, in turn, conceals the edge 35 of the fabric headliner 14. The headliner 14 stops short of the groove 32 and is attached to the underside of the section 24 by any suitable means, such as an adhesive.

The frame 18 also includes a section 36 cantilevered into the opening 16, in the plane of the roof, and retaining a resilient molding 38 on its upper surface.

As can best be seen in FIG. 8, the resilient molding 38 comprises an elongated tubular section 39 having a base portion 41 which is seated on the upper surface 43 of the frame cantilevered section 36. The tubular section 39 has upwardly and outwardly inclined integral side walls 45 and 47 which are joined at their upper extremities by top portion 49 to define thereinbetween an air cavity 51. The base portion 41 has an inclined, integrally formed flange portion 53 which extends upwardly to approximately the same height as the tubular section 39. The outside surface 57 of the upright flange portion 53 is seated on the inclined wall 59 of the frame 18. The abutting surfaces of the molding 38 and frame 18 are secured to one another by any suitable means, such as an adhesive. The opposing surfaces of the tubular section 39 and the upright flange portion 53 are laterally spaced from each other and define a longitudinal space 55, for a purpose to be described hereinafter. The upper surface of the top portion 49 has a plurality of laterally spaced, longitudinally disposed ridges 61 which are adapted to receive and support the underside of the perimeter of the panel 20. When the panel 20 is in the closed position illustrated in FIG. 3 (and as will be described hereinafter), the tubular section 39 is compressed; however, due to the longitudinal space 55, the constant expansion and compression of the tubular section 39 does not exert any forces onto the flange portion 53 and thus assures that the flange portion 53 will not prematurely separate from the flange wall 59. In the preferred embodiment the molding 38 is made from a closed cell, neoprene sponge material.

Figure 3:
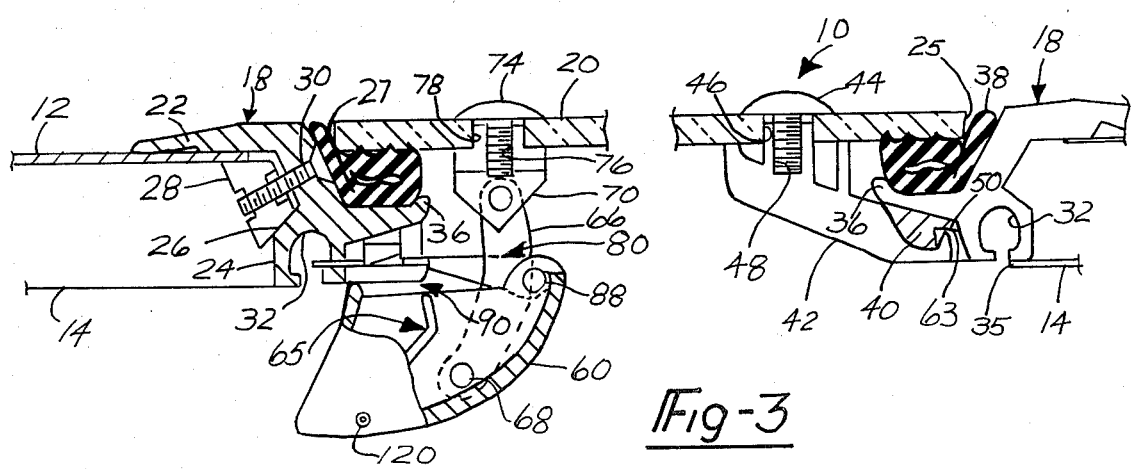
FIG. 3 is a sectional view through the sunroof panel and vehicle roof, taken along Line 3—3 of FIG. 1, showing the front and rear attachments between the panel and the roof frame when the panel is in its closed position, with the intermediate section of the panel broken away.

As can best be seen in FIG. 3, at two spaced points along the forward edge of the opening 16, bayonet support members 40 are attached to the lower side of the frame cantilevered section 36. The support members 40 are shaped to cooperate with the frame 18 so as to define a pair of recesses 63 which are adapted to cooperate with a pair of extending bayonet members 42 affixed to the underside of the panel 20 at two spaced points on its forward edge. The bayonets are secured to the panel by bolts 44 extending through holes 46 formed in the panel 20 and mating with internally threaded bosses 48 formed on the upper surface of the bayonets 42, which fit into the holes 46.

The bayonets project toward the edge of the panel 20 at a slight, downwardly inclined angle away from the panel and have upwardly right angled, bent, extreme end sections 50. These ends are received by the support member recesses 63 or are removable from the support member recesses 63 when the forward edge of the panel 20 is supported against the section of the resilient molding 38 above the slots and the panel is inclined with respect to the roof 12 at an angle of about 30°. When the panel is then rotated into closer alignment with the roof, the upper edge of the bayonet section 50 presses against the lower edge of the bayonet support member 40 and pulls the underside of the panel edge against the resilient molding 38. At these lower angles, the extending section 50 cannot be removed from the recesses 63, and the two act as a hinge to allow pivoting motion of the panel 20 relative to the roof 12.

When the perimeter of the panel 20 is in abutment with the resilient molding 38 all the way around the perimeter of the opening 16, the engagement of the bayonet section 50 and the support member recesses 63 forces the edge of the panel into pressured engagement with the resilient section, as shown in FIG. 3. To insert the panel 20 into engagement with the roof 12 or to remove the panel 20 from the roof 12, the panel 20 is inclined to a sufficient angle; and the two sections 50 of the bayonets 42 are removed from the frame recesses 63.

Figure 2:
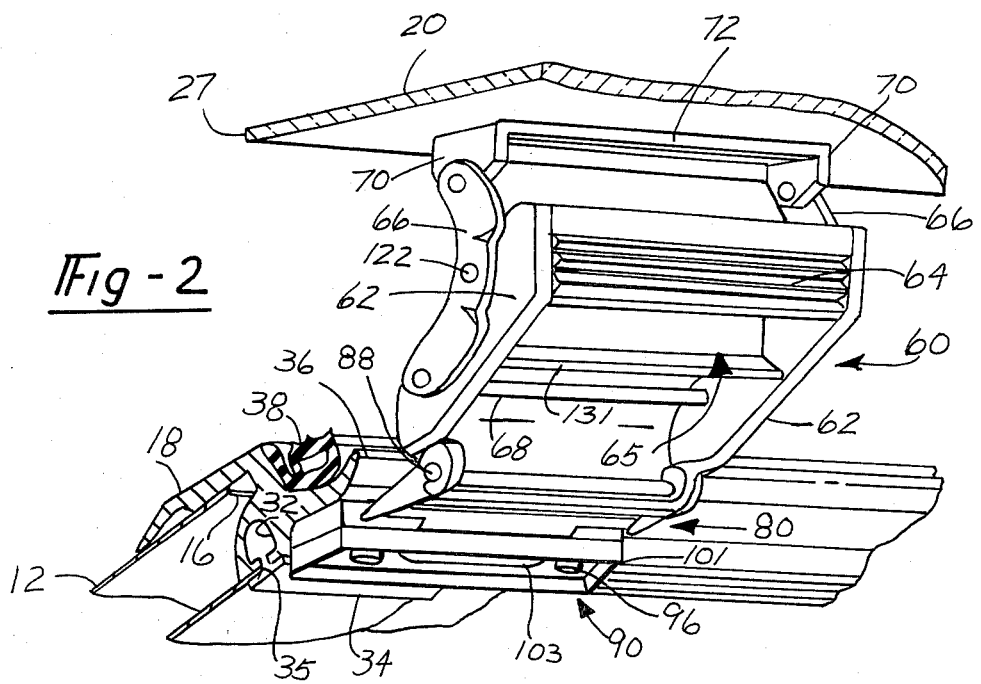
FIG. 2 is a partially sectioned, perspective view of the latch mechanism attached to the rear end of the panel and the associated locking mechanism attached to the frame, with the handle detent mechanism in an engaged position.

Referring now to FIGS. 2, 3 and 4, it can be seen that the rear edge of the panel 20 is fastened to the frame 18 by means of a two-part, separable fastener centered about a latch handle member 60. The handle is a flat, thin, curved, injection molded section having a pair of side flanges 62 and an end section 64 which extends transversely to the flanges and to the handle section 60. The handle member 60 includes a detent release mechanism 65, which will be described hereinafter.

A pair of flat, slightly arcuate, stamped hinges 66 are pivotally connected to the opposite sides of the latch handle 60 at one of their ends by a pivot pin 68, journaled in holes in the two handle flanges 62 so that its ends extend slightly beyond the flanges. The ends of the pin pass through holes formed in the hinges 66 and are peened. The other ends of the hinges 66 are pivotally supported on two ears 70 which extend downwardly from the ends of a flat, sheet metal glass mount 72. The mount 72 is secured to the underside of the panel 20, midway along the rear edge of the panel 20 and slightly inwardly from the edge, by a pair of bolts 74 (FIG. 3) which mate with internally threaded cylindrical bosses 76 extending upwardly from the mount 72 and passing through holes 78 in the panel.

The latch handle 60 also pivotally supports a flat, sheet metal extending tongue 80. As illustrated in the exploded view of FIG. 8, the tongue has a central catch aperture 82 and a pair of ears 84 which are bent normally to the main tongue surface and have holes 86 formed centrally therein. The tongue is pivotally connected to the end of the latch handle 60, opposite to the flange 64, by a pivot pin 88 which extends between the latch handle flanges 62 and has its ends projecting slightly beyond these flanges. The ends of the pin pass through the holes 86 of the tongue and are retained by snap rings or the like.

The tongue 80 is adapted to be inserted and retained within a releasable lock mechanism, generally indicated at 90 (FIG. 8), fixed to the underside of the frame 18 at the center of the rear of the opening 16.

The lock 90 includes an elongated retainer member 92 having an inclined catch 94, projecting from the bottom of its underside, and having a pair of downwardly extending push buttons 96 extending from its end. The push buttons project through holes 98 formed in a bottom plate 100.

The retainer 92 is supported for vertical sliding motion in a slot 102 formed in a base member 104. The base 104 is fixed to the underside of the extending section 36 of the edge frame 18 by a pair of screws (not shown). The screws extend through holes 108 formed in the frame, pass through holes 110 formed in the retainer base 104, and threadingly engage holes formed on a pair of cylindrical bosses 112 which extend upwardly from the top of the bottom plate 100 and through the holes 110 in the base 104. The retainer 92 is contained in the base 104, sandwiched between the underside of the frame cantilevered section 36 and the bottom plate 100. The retainer 96 is urged downwardly, into abutment with the bottom plate 100, by a pair of springs 114 which have their ends in abutment with the base 104 and the retainer 92. Thus, the catch 94 on the bottom of the retainer 92 normally abuts the bottom plate 100. The retainer may be lifted away from the bottom plate, against the bias of the springs, by finger pressure on the push buttons 96 extending through the bottom plate 100.

The bottom peripheral edge of the bottom plate 100 has an outer wall 101 which completely encircles the area into which the push buttons 96 extend, as well as extending beyond the push buttons 96. The bottom plate 100 further comprises a centrally disposed rib 103 which extends across the mid-section of the bottom plate 100 between the push buttons 96. The rib has a height approximately equal to the height of the outer wall 101 and exceeding the height of the push buttons 96 when the same are fully extended from the holes 98 under the force of the springs 114. It can thus be seen that when the handle section 60 is in the closed position as illustrated in FIG. 3, the outer wall 101 and the rib 103 will prevent an accidental engagement with the push buttons 96 and thus prevent the premature unlocking of the lock mechanism 90 (FIG. 5).

The tongue 80 may be inserted between the bottom plate 100 and catch 94, as shown in FIGS. 2 and 3, so that it abuts the inclined surface of the catch 94 and urges the retainer upwardly, compressing the springs 114. The catch 92 then enters the tongue aperture 82 and moves downwardly under the bias of the springs to lock the tongue 80 against removal. The push buttons may be manually pressed to release the tongue 80.

When the panel 20 is hingedly retained on the forward edge of the frame by engagement of the bayonet ends 50 in the frame recesses 63 and the rear end of the panel 20 is inclined a few degrees with respect to the roof, the tongue 80 may be inserted into the lock 90. The latch handle 60 may then be disposed in one of two fixed positions. In the position shown in FIG. 2, the latch handle 60 is inclined upwardly with respect to the tongue. In this position, a pair of detents 120 formed on the opposite ends of a flexible detent rod 121 (FIG. 7) and extending through holes 127 in the opposite sides 62 of the handle 60 makes frictional engagement with indentations 122 formed outwardly on the center of each of the hinges 66. In this position the rear end of the panel 20 is tilted upwardly with respect to the roof, as shown in FIG. 2, to ventilate the interior of the vehicle. The detent rod 121 has an enlarged, diametered, central section 123 which defines a pair of shoulders 125 that abut the inside surfaces of the sides 62 of the latch handle 60 and thus limits its outward projection of the detent ends 120. The detent mechanism 65 further comprises a release member 131 (FIGS. 6 and 7) which has its mid-section 133 attached to the detent rod 121 by means of bent flanges 135, such that the release member 131 is secured to the rod 121 and the rod 121 moves with the release member 131. The release member 131 includes an upper bent end 141 (FIG. 6) which is adapted to be grasped to facilitate the release of the detent end 120 from the hinges 66, as will be explained hereinafter. The lower end (FIG. 6) of the release member 131 below the detent rod 121 engages the inside surface (at 143) of the latch handle 60 such that upon engagement of the release member 131 by a user, the pivotable movement of the member 131 about the pivot point 143 and toward the end section 64 will bend the flexible detent rod 121 to a sufficient degree such that the detent ends 120 will be withdrawn into the holes 127 and out of engagement with the indentations 122 in the hinges 66. The handle 60 may then be swung downwardly to the locked position illustrated in FIG. 3. In this position, the bottoms of the flanges 62 abut the underside of the lock base outer wall 101 and the rib 103, and the handle covers (but does not engage) the push buttons 96. The rear edge of the panel 20 is drawn against the resilient molding 38, compressing the molding 38. In this position the bayonets 42 also press against the forward edge of the bayonet supports 40.

As the latch is moved into its locked position forcing the rear edge of the panel downwardly, the panel 20 is bent into conformity with the frame, and the side edges of the panel compress the corresponding sections of the molding 38. This provides a secure engagement of the edges of the panel with the molding, along its entire perimeter, despite the fact that the fasteners are only located on the forward and rear edges of the panel.

When the tongue 80 is retained in the lock mechanism 90, the hinges 66 and the section of the latch handle 60 between the pivot pins 68 and 88 act as an over-center linkage. This linkage has a pair of stable modes on both sides of the over-center condition wherein the pivot pin 88, which supports the tongue, is aligned with the two pivotable ends of the hinges 66. This over-center condition occurs between the closed position of FIG. 3 and the open position of FIG. 2. The latch is thus biased into intimate engagement with the frame when in the locked position of FIG. 3.

To remove the panel 20, the latch is first pulled back, through its over-center condition, to the unlatched position of FIG. 2. The push buttons 96 are then pressed upwardly, releasing the tongue, and the tongue is removed from the lock. The panel is then swung upwardly about its rear end, and the extending sections 50 of the bayonets 42 are removed from the bayonet recesses 63, freeing the panel.

Although only one form of applicant's invention has been disclosed, it should be understood by those skilled in the art of sunroofs that other forms of applicant's invention may be had, all coming within the spirit of the invention and scope of the appended claims.

What is claimed is as follows:

1. A sunroof for a vehicle having an opening in its roof and comprising:
    a frame extending about the edge of the opening and having a supporting surface lying in a plane substantially parallel to the vehicle roof;
    a resilient section extending about a periphery of the opening to seal said opening carried by said supporting surface; and
    a panel adapted to be supported with its perimeter in abutment with said resilient section, said frame having an upright rigid supporting section; said resilient section comprising a tubular member having a base supported section, said tubular member being compressed by said panel when said panel is forced into engagement with said resilient section; said resilient section having a flange integral with said base and extending from said base with one side of said flange being laterally spaced from an adjacent side of said tubular member to define a slot thereinbetween extending from said base, the other side of said flange being in abutment with and supported by said upright frame section.

* * * * *